(No Model.)
S. ELLIOTT.
SULKY.
No. 539,578. Patented May 21, 1895.
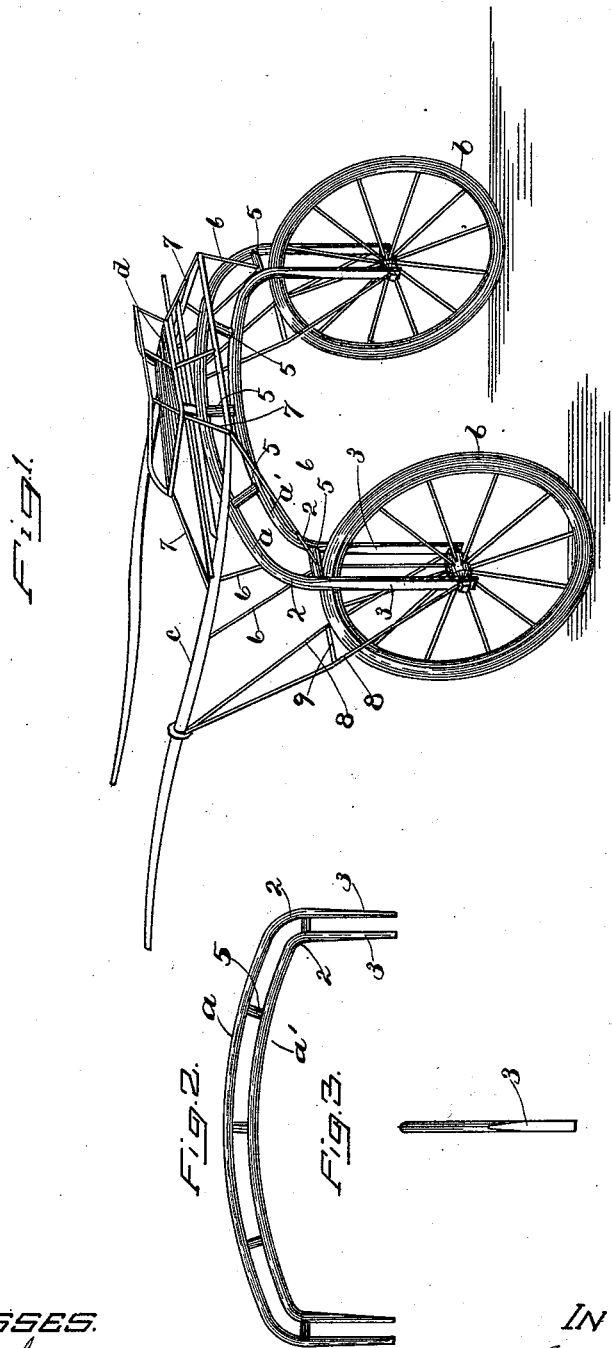
WITNESSES.
C. B. Cooker.
Lucy F. Graves.
INVENTOR.
Sterling Elliott.
By B. J. Noyes,
Atty.

UNITED STATES PATENT OFFICE.

STERLING ELLIOTT, OF NEWTON, MASSACHUSETTS, ASSIGNOR TO THE HICKORY WHEEL COMPANY, OF HARTFORD, CONNECTICUT.

SULKY.

SPECIFICATION forming part of Letters Patent No. 539,578, dated May 21, 1895.

Application filed October 10, 1892. Serial No. 448,313. (No model.)

*To all whom it may concern:*

Be it known that I, STERLING ELLIOTT, of Newton, county of Middlesex, State of Massachusetts, have invented an Improvement in Sulkies, of which the following description, in connection with the accompanying drawings, is a specification, like letters and figures on the drawings representing like parts.

This invention has for its object to improve the construction of sulkies, the invention residing particularly in the axle or frame which supports the wheels, and also the shafts and seat.

In accordance with this invention the axle or frame is composed of two rods arranged in parallelism, preferably bent wood or tubular metal, arched at the middle, and curved or bent near the ends so as to form or present downwardly extended and substantially vertical arms which astride the wheels and afford bearings therefor at their lower ends. These two rods are rigidly connected together by several short bars or posts at suitable points. The shafts and seat are supported upon said axle or frame, and brace rods connect the lower extremities of said axle or frame with the shafts, which brace rods incidentally serve as guards for the wheels.

Figure 1 shows in perspective view a sulky embodying this invention; Fig. 2, a rear side elevation of the axle or supporting-frame, and Fig. 3 an end view of said axle or supporting-frame.

The axle or supporting frame consists of two rods or bars $a, a'$, preferably wood or tubular metal, arranged substantially in parallelism, being herein shown as arched at the middle and abruptly bent near the ends as at 2, so that the end portions 3, will extend downwardly at right angles to the main body of the frame, and thereby form or present arms which astride the wheels $b$, and afford bearings therefor at their lower extremities. The end portions 3, of these rods or bars are tapered and also flattened gradually toward their extremities, as best shown in Figs. 2 and 3.

The rods or bars $a, a'$, are rigidly secured together by short connecting bars or posts 5, located at suitable points, but so as not to interfere with other parts.

The shafts $c$, are supported on said axle or frame by braces or supports 6, and the seat $d$, is supported on the shafts by braces or supports 7.

A brace rod 8, connects the lower extremity of each arm 3, of the supporting frame, with the shaft $c$, above it, thereby astriding the wheels, and the brace rods which astride each wheel are rigidly secured together by a short bar 9, just in front of the wheel. Said brace rods 8, 8, at each side of the vehicle while serving to more rigidly connect the parts, and prevent the arms 3, 3, from springing, also serve as guards for the wheels.

I claim—

1. In a sulky, the combination of an axle or supporting frame consisting of two connected rods $a, a'$, the ends of which are bent substantially at right angles with relation to the central portion, to form or present arms which astride the wheels, and afford bearings therefor at or near their extremities, and the shafts and seat supported upon said axle or frame, substantially as described.

2. In a sulky, the combination of an axle or frame consisting of two connected rods $a, a'$, the ends of which are tapered and flattened and bent at substantially right angles with relation to the central portion to form or present arms which astride the wheels and afford bearings therefor at or near their extremities, and the shafts and seat supported upon said axle or frame, substantially as described.

3. In a sulky, the combination of the axle or frame consisting of two connected and parallelly arranged rods $a, a'$, arched at the middle, and bent near the ends so that the end portions lie substantially at right angles with relation to the middle portion, and form arms which astride the wheels and afford bearings therefor at or near their lower extremities, and the shafts and seat supported upon said axle or frame, substantially as described.

In testimony whereof I have signed my name to this specification in the presence of two subscribing witnesses.

STERLING ELLIOTT.

Witnesses:
 BERNICE J. NOYES,
 LUCY F. GRAVES.